United States Patent
Hamaguchi

(10) Patent No.: US 7,917,919 B2
(45) Date of Patent: Mar. 29, 2011

(54) DISC CLAMPING MECHANISM AND DISC DRIVE DEVICE

(75) Inventor: Yuko Hamaguchi, Gunma-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 838 days.

(21) Appl. No.: 11/889,904

(22) Filed: Aug. 17, 2007

(65) Prior Publication Data

US 2008/0052737 A1    Feb. 28, 2008

(30) Foreign Application Priority Data

Aug. 23, 2006    (JP) ................. P2006-226287

(51) Int. Cl.
*G11B 17/03* (2006.01)
*G11B 17/04* (2006.01)

(52) U.S. Cl. ......... 720/713; 720/621; 720/655; 720/712
(58) Field of Classification Search .................. 720/648, 720/651, 703–714
See application file for complete search history.

(56) References Cited

U.S. PATENT DOCUMENTS

2003/0133398 A1 *    7/2003    Shishido ................ 369/270

FOREIGN PATENT DOCUMENTS

| JP | 60-214455 | 10/1985 |
| JP | H06-4945 | 1/1994 |
| JP | 10-092099 | 4/1998 |
| JP | 10-283740 | 10/1998 |
| JP | 2006048838 A * | 2/2006 |
| JP | 2007-102920 | 4/2007 |

OTHER PUBLICATIONS

Machine-Assisted Translation of JP 2006-048838 A.*
Machine-Assisted Translation of JP 10-092099 A.*

* cited by examiner

*Primary Examiner* — Wayne R Young
*Assistant Examiner* — Nathan A Danielsen
(74) *Attorney, Agent, or Firm* — The Nath Law Group; Jerald L. Meyer; Sungyeop Chung

(57) ABSTRACT

A disc clamping mechanism includes a clamp board, a clamp base, a first supporting unit and a second supporting unit. The clamp board rotatably clamps a disc in cooperation with a turntable to be rotated in a housing. The clamp base rotatably supports the clamp board at a position opposite to the turntable, and is movable so as to move away from or come into contact with the turntable. The first supporting unit comes into contact with a first peripheral edge of the clamp board protruding from the clamp base when the clamp board moves away from the disc according to the movement of the clamp base, to exert pushing force in a direction of the turntable side and pushing force in a direction of the clamp base side against the first peripheral edge. The second supporting unit is provided at the clamp base, and securely supports the second peripheral edge of the clamp board situated at a position opposite to the first peripheral edge when the first peripheral edge is pushed by the first supporting unit.

6 Claims, 5 Drawing Sheets

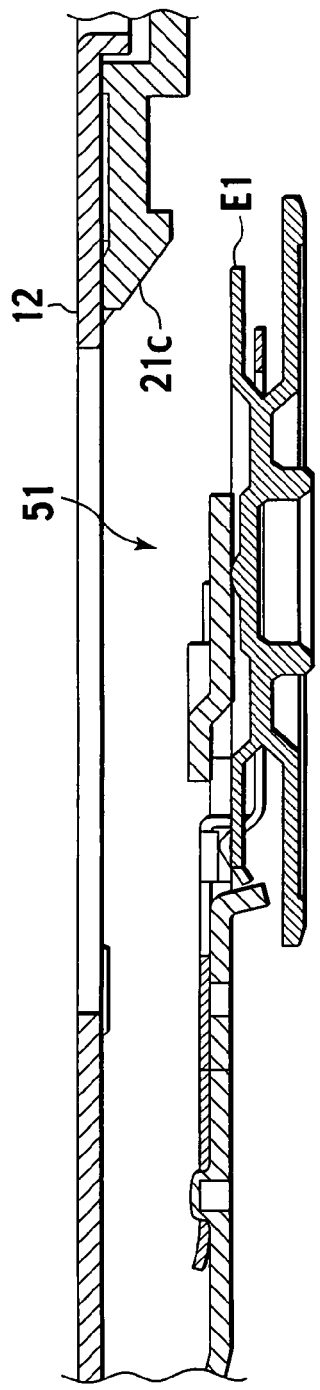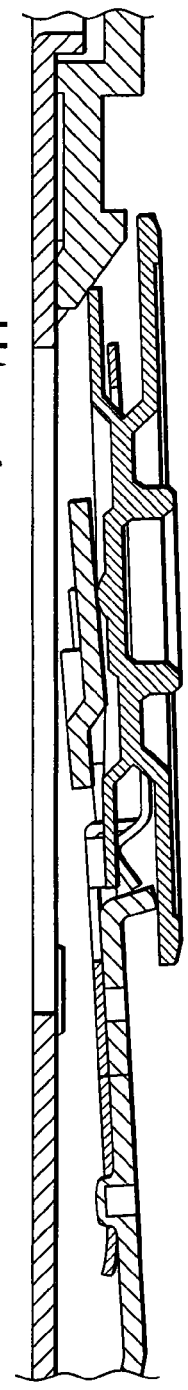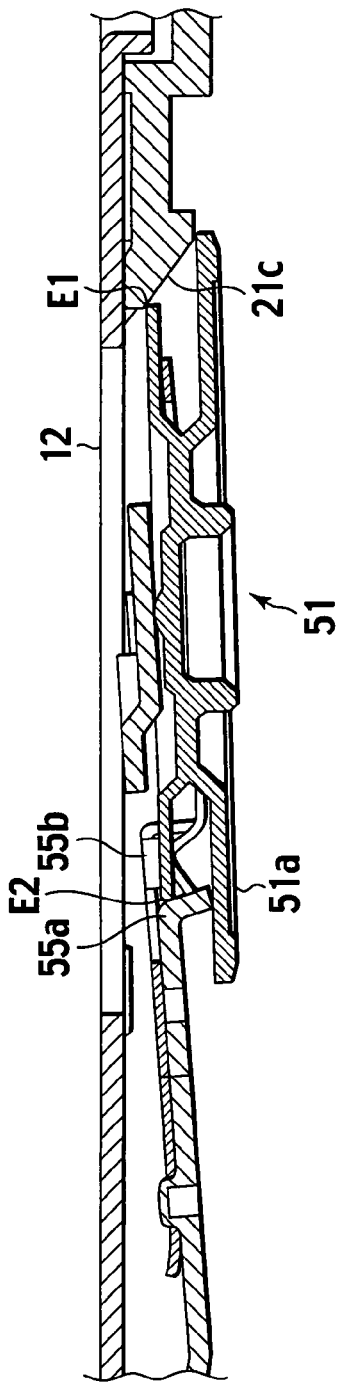
FIG. 8A  FIG. 8B  FIG. 8C  FIG. 8D

US 7,917,919 B2

DISC CLAMPING MECHANISM AND DISC DRIVE DEVICE

BACKGROUND OF THE INVENTION

1. Field of the Invention

The present invention relates to a disc drive device used for recording desired music information and the like on a disc or reproducing the recorded information, and more particularly, to a disc drive device provided with a mechanism for clamping a disc.

2. Description of the Related Art

In general, a disc drive device such as a CD player or a DVD recorder is equipped with a turntable, an optical pickup and a disc clamping mechanism. The turntable supports a disc and rotates the disc. The optical pickup moves in a radial direction of the disc along a board surface of the disc. The disc clamping mechanism clamps the disc so that the disc disposed on the turntable may rotate in synchronization with the rotation of the turntable.

The disc clamping mechanism has a clamp base and a clamp board. The clamp base is movably provided in a housing of the disc drive device. The clamp board is rotatably supported by the clamp base. In the disc clamping mechanism, the clamp board comes closer to/off the turntable dependent on the movement of the clamp base. When the clamp board moves in a direction that it comes closer to the turntable, the disc is rotatably clamped on the turntable by the clamp board at the central part of the disc.

In the condition where the clamp board is rotatably supported by the clamp base, the clamp board has one or more free ends in an axial direction and/or a radial direction of the clamp board. Therefore, in the condition where the clamp board is away from the turntable, the clamp board is likely to rattle at each free end thereof when receiving external vibration. As a result, there is a problem that the disc drive device might produce a big noise.

In order to resolve the above-described problem, Japanese Patent Application Laid-Open No. H10(1998)-92099 discloses a construction configured to provide a spring over a clamp board (clamper). With this construction, when the clamp board moves away from a turntable, the spring presses the clamp board from above the clamp board to be elastically retained.

Further, Japanese Patent Application Laid-Open No. S60 (1985)-214455 discloses a construction configured to rotatably support a clamp board (pushing member) by a supporting member made up of magnetic materials and to incorporate a magnet into the clamp board. With this construction, in the condition where the clamp board is away from a turntable (non-clamped state), the clamp board is attracted to the supporting member by its own magnetic force.

Furthermore, Japanese Patent Application Laid-Open No. H10(1998)-283740 discloses a construction configured to support a clamp board (clamper plate) made up of plastic magnet by a clamp base (clamper arm). With this construction, when the clamp board moves away from a turntable, the clamp board is attracted to a chassis by its own magnetic force.

However, with the construction disclosed in Japanese Patent Application Laid-Open No. H10(1998)-92099, it is necessary to provide the dedicated spring used for preventing the clamp board from rattling. This increases the number of parts, which leads to higher costs. Also, this requires to incorporate the spring into the disc drive device, which increases the number of man-hours to reduce productivity. Further, this requires a large gap between a chassis and the clamp board, which has an adverse effect on the reduction in thickness of the disc drive device. Furthermore, this may cause secondary damage caused by the resonance of the spring.

Further, with the construction disclosed in Japanese Patent Application Laid-Open No. S60(1985)-214455, it is necessary to provide on the top of the clamp board a buffer member used for preventing the clamp board from directly hitting a case (housing) by the vibration of the supporting member. This increases the number of parts, which leads to higher costs. Also, there is a possibility that the magnetic force of the clamp board acting on the supporting member might reduce rotational performance of the clamp board.

Furthermore, with the construction disclosed in Japanese Patent Application Laid-Open No. H10(1998)-283740, a peripheral edge of one end of the clamp board is only attracted to the chassis. Therefore, in a case that the disc drive device is used within a vibration system such as a vehicle-mounted type, the clamp board vibrates about a part where the clamp board is attracted to the chassis as a fulcrum point. As a result, there is a possibility that the disc drive device might produce a big noise.

SUMMARY OF THE INVENTION

An object of the present invention is to provide a disc clamping mechanism and a disc drive device capable of ensuring the suppression of vibrations of a clamp board and preventing the generation of noises without the need to increase the number of parts.

To achieve the above-described object, the present invention provides the following (A) to (K):

(A) a disc clamping mechanism comprising a clamp board (51) that rotatably clamps a disc (D) in cooperation with a turntable (42) to be rotated in a housing (1); a clamp base (52) that rotatably supports the clamp board (51) at a position opposite to the turntable (42), and being movable so as to move away from or come into contact with the turntable (42); a first supporting unit configured to come into contact with a first peripheral edge (E1) of the clamp board (51) protruding from the clamp base (52) when the clamp board (51) moves away from the disc (D) according to the movement of the clamp base (52), to exert pushing force (F1) in a direction of the turntable side and pushing force (F2) in a direction of the clamp base side against the first peripheral edge (E1); and a second supporting unit provided at the clamp base (52), and configured to securely support a second peripheral edge (E2) of the clamp board (51) situated at an opposite side to the first peripheral edge (E1) when the first peripheral edge (E1) is pushed by the first supporting unit;

(B) The disc clamping mechanism according to (A), wherein the first supporting unit is a slope section (21c) formed in the housing (1);

(C) The disc clamping mechanism according to (A), wherein the first supporting unit is a slope section (21c) securely provided in the housing (1) as a member (21) separated from the housing (1).

(D) A disc drive device comprising: a housing (1); a turntable (42) to be rotated in the housing (1); and a disc clamping mechanism that rotatably clamps a disc (D) in the housing (1); the disc clamping mechanism comprising: a clamp board (51) that rotatably clamps the disc (D) in cooperation with the turntable (42); a clamp base (52) that rotatably supports the clamp board (51) at a position opposite to the turntable (42), and being movable so as to move away from or come into contact with the turntable (42); a first supporting unit configured to come into contact with a first peripheral edge (E1) of the clamp board (51) protruding from the clamp base (52)

when the clamp board (51) moves away from the disc (D) according to the movement of the clamp base (52), to exert pushing force (F1) in a direction of the turntable side and pushing force (F2) in a direction of the clamp base side against the first peripheral edge (E1); and a second supporting unit provided at the clamp base (52) and configured to securely support a second peripheral edge (E2) of the clamp board (51) situated at an opposite side to the first peripheral edge (E1) when the first peripheral edge (E1) is pushed by the first supporting unit;

(E) The disc drive device according to (D), wherein the first supporting unit is a slope section (21c) formed in the housing (1); and (F) The disc drive device according to (D), wherein the first supporting unit is a slope section (21c) securely provided in the housing (1) as a member (21) separated from the housing (1).

According to the present invention, even if the clamp board is moved away from the turntable, the first peripheral edge and the second peripheral edge are constrained by the first supporting unit and the second supporting unit, respectively, so that capability of suppressing vibrations of the clamp board and preventing the generation of noises are ensured. Also, since the first supporting unit and the second supporting unit are formed on existing parts without using springs or magnets, the generation of noises can be prevented by ensuring the suppression of vibrations of the clamp board, without the need to increase the number of parts.

In particular, in the case that the slope section is formed in the housing as the first supporting unit, the slope section can be also readily formed when the housing is molded. Also, even in the case that the slope section is provided to be fixed to the housing as the member separated from the housing, existing parts are utilized as the member, thereby the slope section can be formed to the existing parts.

BRIEF DESCRIPTION OF THE DRAWINGS

FIGS. 8A to 8D are partially enlarged views of the essential parts as shown in FIGS. 7A to 7D.

DESCRIPTION OF THE PREFERRED EMBODIMENTS

Hereinafter, a disc drive device provided with a disc clamping mechanism according to the present embodiment will be described in details with reference to FIGS. 1 to 8D.

Figure 1:
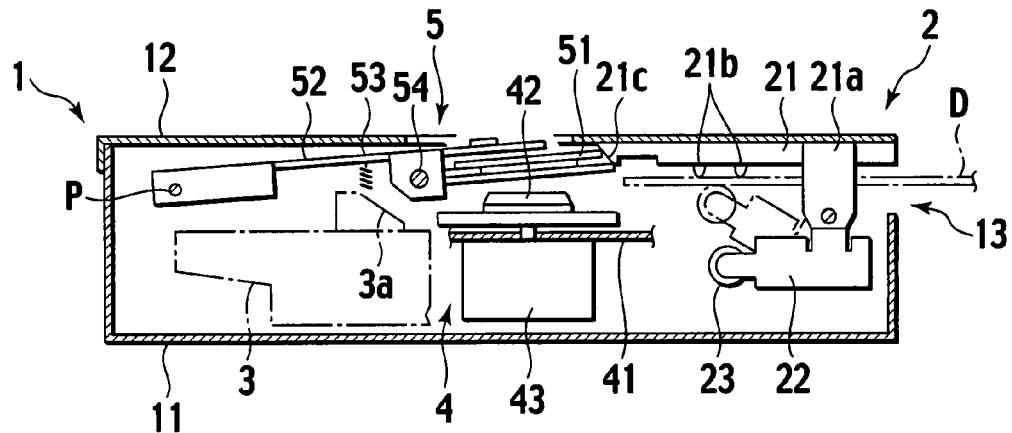
FIG. 1 is a side view of internal structure of a disc drive device provided with a clamping mechanism according to an embodiment of the present invention.
Figure 2:
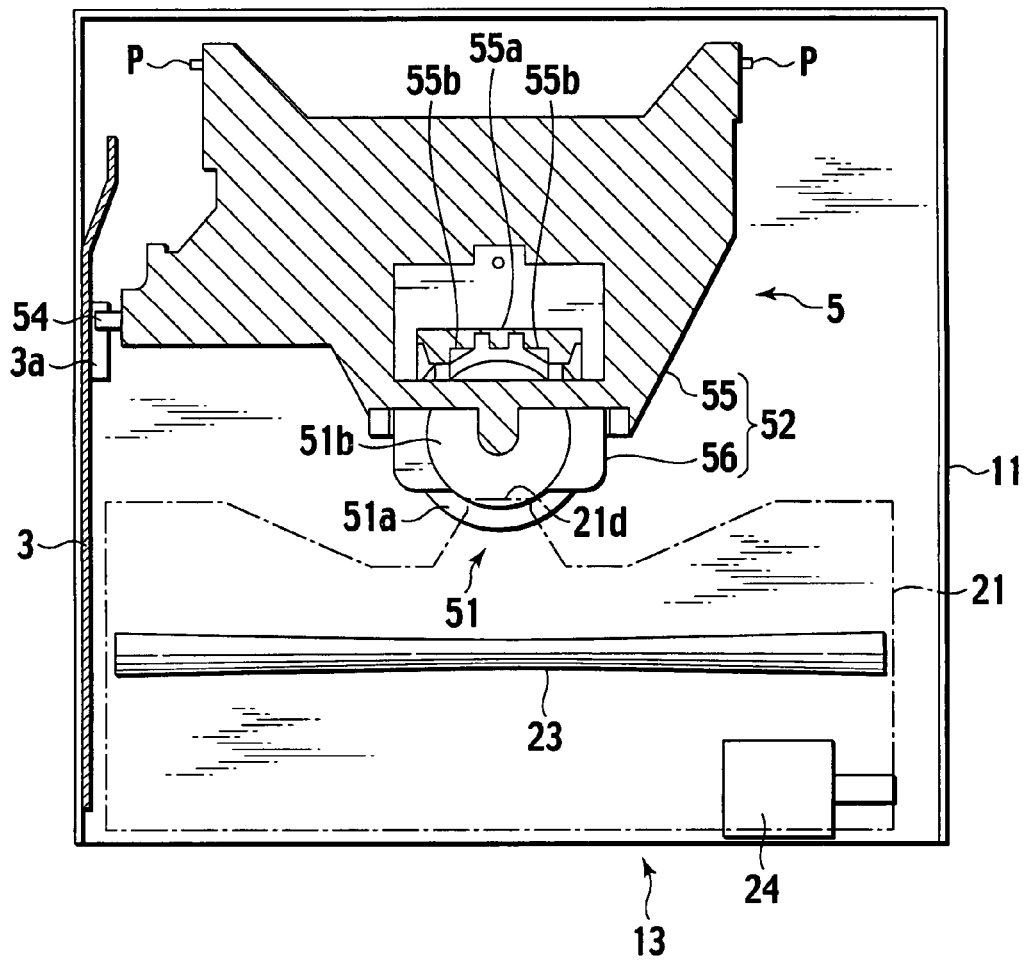
FIG. 2 is a schematic plan view of the internal structure of the disc drive device provided with the clamping mechanism according to the embodiment of the present invention.

FIG. 1 is a schematic side view of internal structure of the disc drive device provided with the disc clamping mechanism according to the present embodiment. FIG. 2 is a schematic plan view of the internal structure of the disc drive device provided with the disc clamping mechanism according to the present embodiment.

As illustrated in FIG. 1, a housing 1 forms an outer casing of the disc drive device. The housing 1 includes a base chassis 11 formed by press working of metal plate and a top board 12 for covering the top of the base chassis 11. At the front face of the housing 1, there is formed an opening 13 through which a disc D is to be carried into the housing 1.

A disc conveying mechanism 2 is provided at the opening 13 side within the housing 1. The disc conveying mechanism 2 includes a plate 21 for helping a disc to slide in contact therewith which is made of resin and securely provided on an inner side of the top board 12, a flap plate 22 supported movably in a vertical direction of the disc drive device by brackets 21a, 21a provided on both sides (frontward side and rearward side of FIG. 1) of the plate 21 for helping a disc to slide in contact therewith, and a feed roller 23 rotatably provided along an inner edge of the flap plate 22. Incidentally, the feed roller 23 is on standby at a position away from a position into which the disc D is to be carried, before the disc D is carried into the housing 1. An actual standby position is situated a little higher than the position as shown with a solid line in FIG. 1.

When the disc D is carried into the housing 1, the disc conveying mechanism 2 causes the feed roller 23 to move (turn) upward from the standby position while rotating the feed roller 23, and then the disc D to be sandwiched between the feed roller 23 and the plate 21 for helping a disc to slide in contact therewith. Under this condition, the disc conveying mechanism 2 helps to carry the disc D into the housing 1.

On the plate 21 for helping a disc to slide in contact therewith, there are formed convex lines 21b, 21b extending in a direction orthogonal to the direction in which the disc D is conveyed. Each convex line 21b is set to have a gradually decreasing width from a bottom thereof at where it contacts the plate 21 for helping a disc to slide in contact therewith towards a top thereof, in a sectional view. Thus, each convex line 21b slides in contact with only a peripheral edge of the disc D. As illustrated in FIG. 2, the feed roller 23 is set to have a gradually decreasing diameter from both ends thereof towards the central area thereof. Thereby, the convex lines 21b, 21b and the feed roller 23 come into contact with only peripheral edges of the disc D. This allows the disc drive device to prevent the disc conveying mechanism 2 from causing wear and tear to a signal recording area of the disc D.

A sliding plate 3 is provided on an inner wall surface at one side of the base chassis 11. A motor 24 activates the feed roller 23 to rotate positively and reversely. Also, driving force of the motor 24 is transmitted to the sliding plate 3 via a transmission mechanism (not shown). Thereby, the sliding plate 3 moves in the same direction as a direction that the disc D is being conveyed by the feed roller 23.

As illustrated in FIG. 1, a drive unit 4 popularly known as "TRAMECHA" is constructed by assembling a turntable 42 and an optical pickup (not shown) and the like in one piece onto a seat plate 41. The turntable 42 is a rotating member for supporting and rotating the disc D. The turntable 42 is directly connected to a rotor shaft of a spindle motor 43 firmly secured to the seat plate 41. Thereby, the turntable 42 is driven to rotate when the rotor shaft rotates. The optical pickup is an electronic component unit for reading out recorded information of the disc D and writing information on the disc D while moving in a radial direction of the disc D supported by the turntable 42. The optical pickup includes a light-emitting element such as laser diode that emits a light to be irradiated on a board surface of the disc D, and a light-receiving element that receives a reflected light from the disc D, or the like.

Incidentally, the seat plate 41 is supported by the base chassis 11 via an anti-vibration damper (not shown). Thereby, the disc drive device is capable of preventing of sound skip of reproduced sound that might be produced when the disc D is driven.

As illustrated in FIGS. 1 and 2, a disc clamping mechanism 5 includes a clamp board 51 for rotatably clamping the disc D in cooperation with the turntable 42, and a clamp base 52 for rotatably supporting the clamp board 51 at a position opposite to the turntable 42.

The clamp board 51 is a circular member with two-stepped construction where a large diameter portion 51a to be crimped onto the central area of the disc D, and a small diameter portion 51b having a smaller diameter than the large diameter portion 51a are molded in one piece with synthetic resin. A linking portion (flat shell plate 51c) for linking the large diameter portion 51a to the small diameter portion 51b is loosely fitted into a part (seat 56) of the clamp base 52, and supported by the clamp base 52 in a state where gaps are present in an axial direction and in a radial direction of the clamp board 51 (Refer to FIG. 6A).

The clamp base 52 is a plate-shaped member formed by press working of a metal plate. The clamp base 52 is coupled to the seat plate 41 of the drive unit 4 via coupling pins P, P in a cantilever condition. The clamp base 52 is vertically movable about the coupling pins P, P.

The clamp base 52 is biased in a direction in which the clamp board 51 approaches to the turntable 42 by a spring 53 spanned between the clamp base 52 and the seat plate 41 (Refer to FIG. 1). At one side of the clamp base 52, a positioning pin 54 is provided to protrude (Refer to FIG. 2). The positioning pin 54 is pushed by a slope-shaped cam profile surface 3a formed on the sliding plate 3 against biasing force of the spring 53.

Before the disc D is carried into the housing 1, since the positioning pin 54 is situated at the top of the cam profile surface 3a, the clamp board 51 is away from the turntable 42. When the disc D begins to be carried into the housing 1, the sliding plate 3 moves leftward in FIG. 1 in synchronization with the rotation of the feed roller 23. By way of the movement of the sliding plate 3, the positioning pin 54 slides down gradually on the slope surface from the top of the cam profile surface 3a, and finally the central area of the disc D that has been carried-in is clamped by the turntable 42 and the clamp board 51. Incidentally, when the disc D is clamped between the turntable 42 and the clamp board 51, the feed roller 23 returns to the standby position and is away from the disc D.

Figure 3:
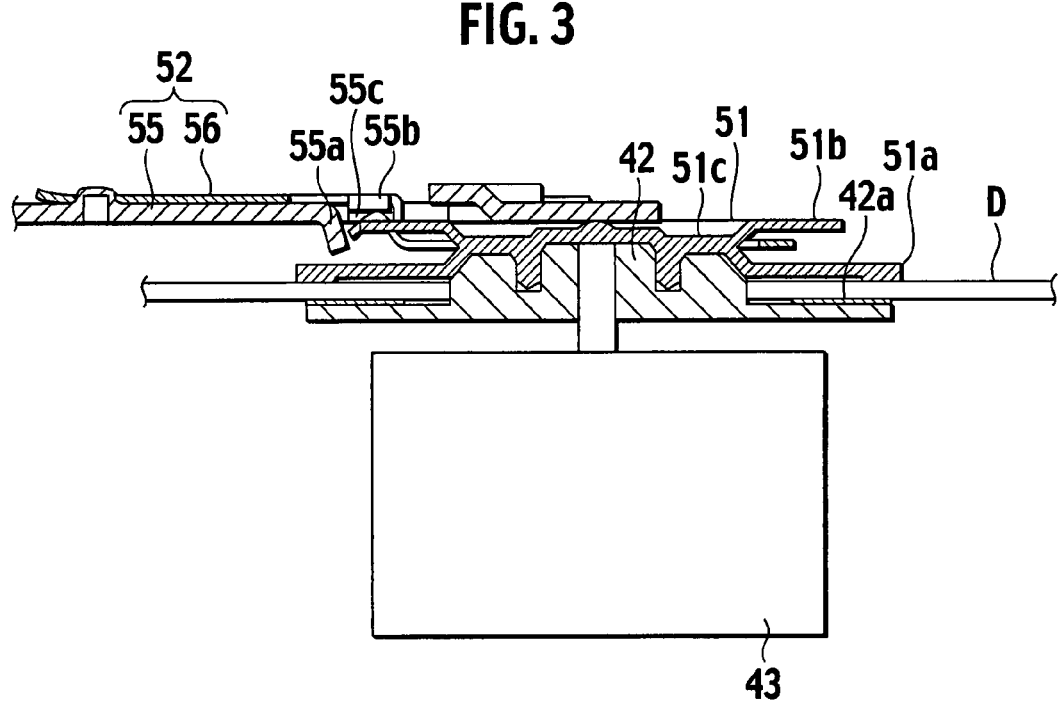
FIG. 3 is an illustrative view showing the state where a disc is clamped by the clamping mechanism according to the embodiment of the present invention.

FIG. 3 illustrates a state where the disc D is being clamped between the turntable 42 and the clamp board 51. In this state, by driving the spindle motor 43, the turntable 42, the disc D and the clamp board 51 rotate together in one piece. A ring-shaped frictional plate 42a is stuck to the turntable 42, thereby preventing the disc D from slipping.

On the other hand, when the disc D begins to be carried out of the housing 1, the sliding plate 3 moves rightward in FIG. 1. The cam profile surface 3a causes the positioning pin 54 to push upward by the movement of the sliding plate 3, thereby causing the clamp board 51 to move away from the disc D against the biasing force of the spring 53. When the clamp board 51 moves away from the disc D, the feed roller 23 moves upward from the standby position and then lifts the disc D from the turntable 42. This causes the disc D to be sandwiched between the feed roller 23 and the plate 21 for helping a disc to slide in contact therewith.

As illustrated in FIG. 1, a slope section 21c (a first supporting unit configured to constrain the clamp board 51) is formed on the plate 21 for helping a disc to slide in contact therewith. When the clamp board 51 is away from the disc D, the slope section 21c pushes a peripheral edge (a first peripheral edge) of the clamp board 51 which protrudes from the clamp base 52 (the details will be described later).

As illustrated in FIGS. 2 and 3, the clamp base 52 includes a main plate 55 and a sheet-shaped seat 56. The main plate 55 has the coupling pins P, P, the positioning pin 54, a small piece 55a and flanges 55b, 55b. The seat 56 is mounted on the main plate 55. The seat 56 supports the clamp board 51. The small piece 55a serves as a second supporting unit configured to constrain the clamp board 51, and is opposed to a peripheral edge (a second peripheral edge situated at the opposite side to the first peripheral edge) of the small diameter portion 51b of the clamp board 51 when the disc D is clamped. The flanges 55b, 55b are at the both sides of the small piece 55a.

Figure 4:
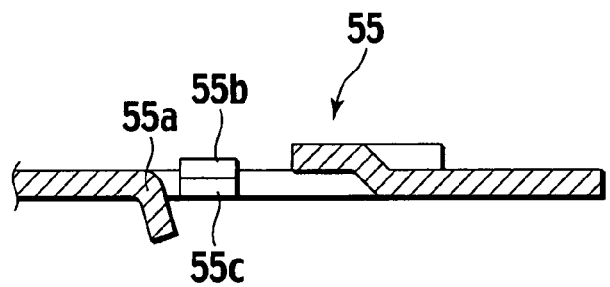
FIG. 4 is a partially enlarged sectional view of a clamp base according to the embodiment of the present invention.
Figure 5:
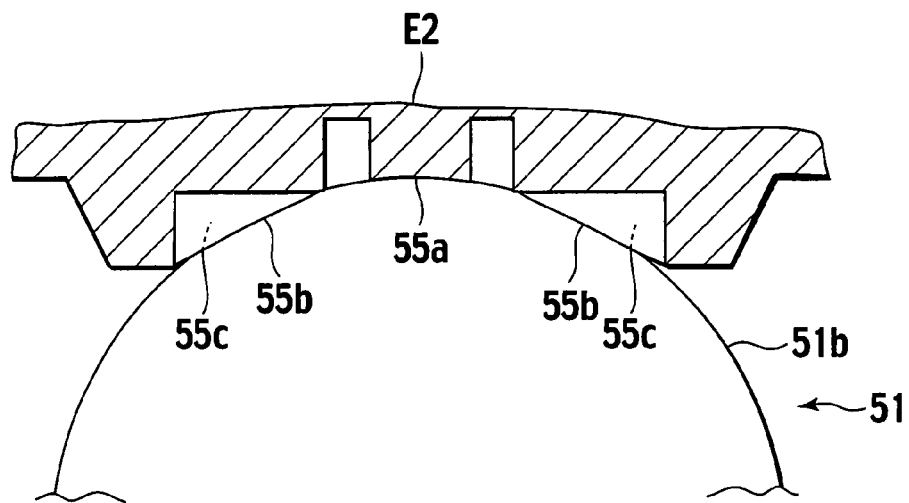
FIG. 5 is a partially enlarged plan view of the clamp base according to the embodiment of the present invention.

As illustrated in FIGS. 3 and 4, the small piece 55a is formed in the shape of the letter J by bending downward a part of the main plate 55. An end edge of the small piece 55a side of each flange 55b is subjected to a plastic deformation upward. At a bottom surface side of the plastically deformed end edge, a bottom raised portion 55c is formed. When the clamp board 51 moves away from the disc D, the peripheral edge (the second peripheral edge) of the small diameter portion 51b gets on the small piece 55a, and the both sides of the small diameter portion 51b come into close contact with the bottom raised portions 55c, 55c of the flanges 55b, 55b (Refer to FIG. 5). Thereby, the clamp board 51 is securely supported by the clamp base 52 and the plate 21 for helping a disc to slide in contact therewith.

Figure 6A:
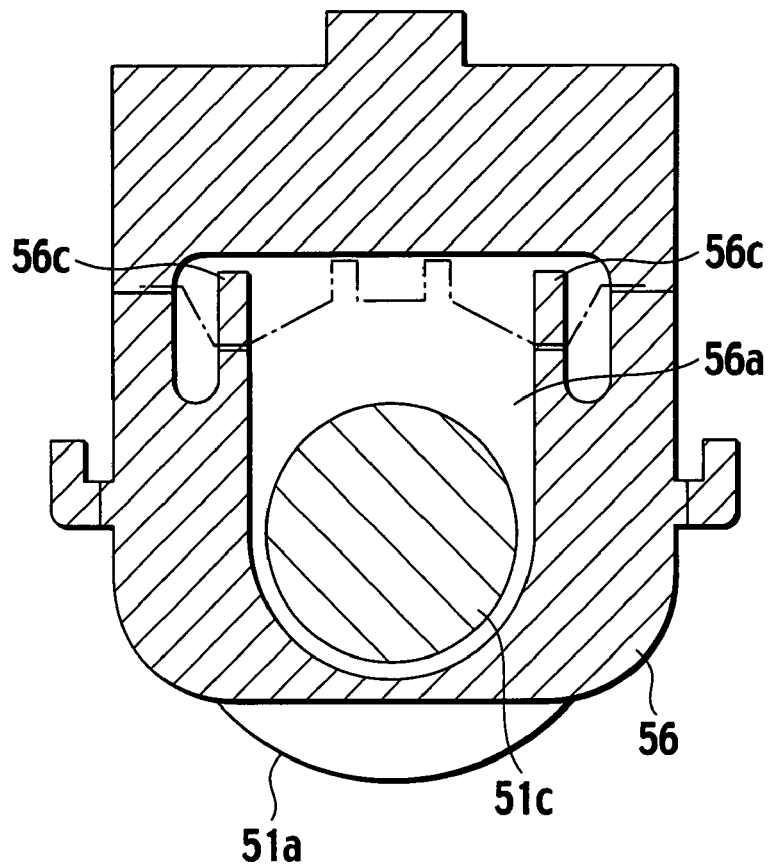
FIGS. 6A and 6B are illustrative views showing the state where the clamp base supports a clamp board according to the embodiment of the present invention.
Figure 6B:
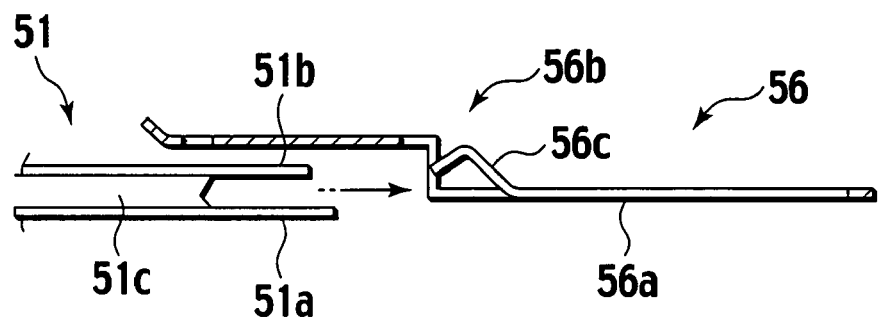
Figure 7A:
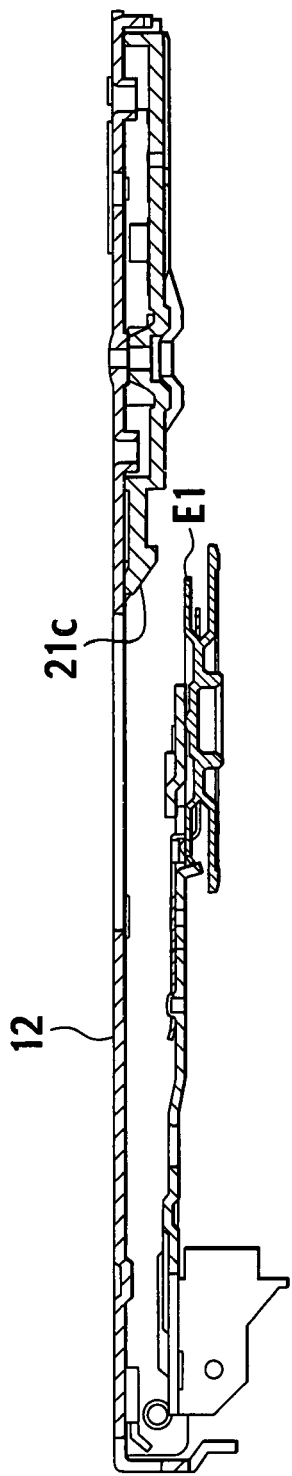
FIGS. 7A to 7D are illustrative views showing the state where the clamp board is constrained according to the embodiment of the present invention.
Figure 7B:
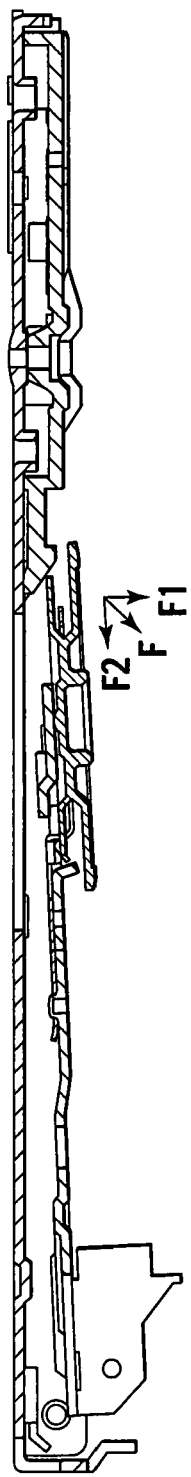
Figure 7C:
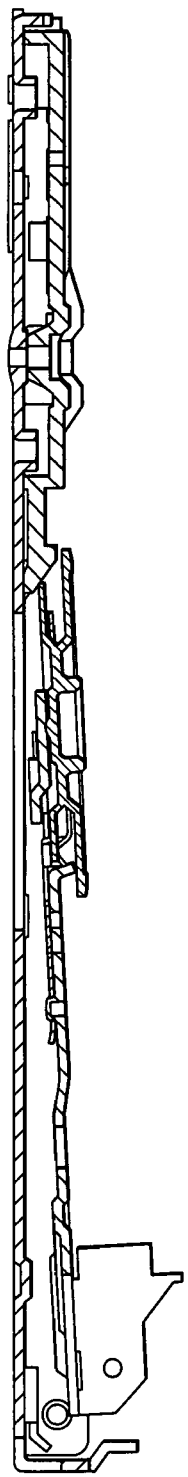
Figure 7D:
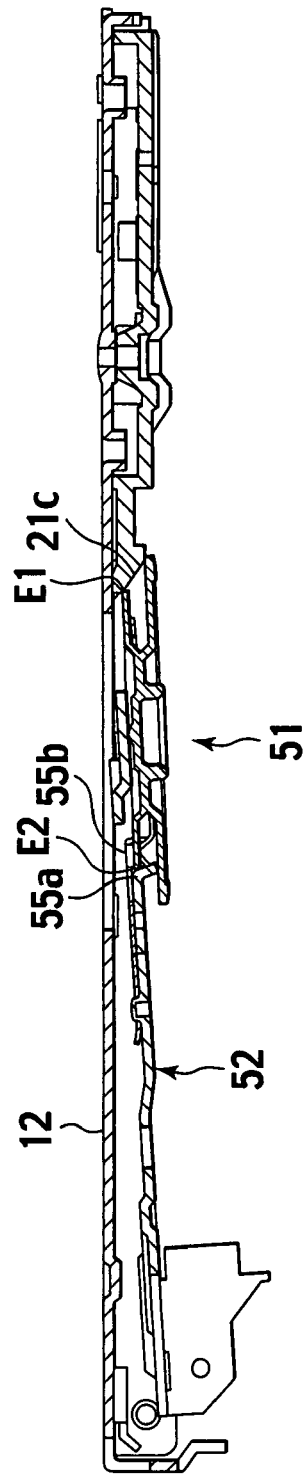

As illustrated in FIG. 6A, a notched hole 56a is formed at the seat 56. The flat shell plate 51c of the clamp board 51 (the linking portion for linking the large diameter portion 51a to the small diameter portion 5b) is loosely fitted to the notched hole 56a. As illustrated in FIG. 6B, a stepped portion 56b is formed at the seat 56 by folding the seat 56 in a width direction. Since the notched portion 56a is formed by straddling the stepped portion 56b, a restricted portion of the clamp board 51 (the flat shell plate 51c) is simply introduced from the position of the stepped portion 56b into the notched hole 56a. Also, plate springs 56c, 56c are formed at the both sides of the notched hole 56a. The plate springs 56c, 56c are adapted to prevent the clamp board 51 from withdrawing from the notched hole 56a.

Next, referring to FIGS. 7A to 8D, action of the disc clamping mechanism 5 will be described.

FIGS. 7A to 7D are illustrative views showing the action of the disc clamping mechanism 5, when the clamp board 51 moves away from the disc D. FIGS. 8A to 8D are enlarged views illustrating essential parts as illustrated in FIGS. 7A to 7D.

When the clamp board 51 moves away from the disc D (not shown), that is, moves upward to a top board 12 side, a first peripheral edge E1 of the clamp board 51 which protrudes from the clamp base 52 comes into contact with the slope section 21c formed on the plate 21 for helping a disc to slide in contact therewith. Incidentally, the slope section 21c is formed at a tip end 21d (Refer to FIG. 2) of the plate 21 for helping a disc to slide in contact therewith.

Since the slope section 21c is formed at the clamp board 51 side of the plate 21 for helping a disc to slide in contact therewith, pushing force $F_1$ in a direction of the turntable 42 side and pushing force $F_2$ in a direction of the clamp base 52 side act from the slope section 21c toward the first peripheral edge E1 of the clamp board 51 when the first peripheral edge E1 comes into contact with the slope section 21c. Incidentally, the pushing force $F_1$ and the pushing force $F_2$ are components of force F acting in a direction perpendicular to the slope section 21c. The clamp board 51 is pushed downward at the first peripheral edge E1 side by the slope section 21c, and is moved to the cramp base 52 side. Thereby, while the first peripheral edge E1 remains to receive the pushing force $F_1$ and the pushing force $F_2$ from the slope section 21c, the second peripheral edge E2 are clamped between the small piece 55a and the flanges 55b, 55b and thus being securely supported by the clamp base 52. That is, the clamp board 51 is reliably and securely supported in the axial direction and in the radial direction of the clamp board 51 by the clamp base 52 and the plate 21 for helping a disc to slide in contact therewith.

Since the clamp board 51 is completely constrained by the slope section 21c (a first supporting unit) and the small piece 55a and the flanges 55b, 55b (a second supporting unit), even if external vibration propagates to the clamp board 51, the clamp board 51 will not rattle. As a result, the disc drive device can prevent the generation of noises.

Next, modified embodiments of the present embodiment will be described.

The slope section 21c may be formed at the top board 12 constituting the housing 1, not limited to the plate 21 for helping a disc to slide in contact therewith. Incidentally, since the plate 21 for helping a disc to slide in contact therewith is a component to be fixed to the top board 12, it can be also regarded as a part of the top board 12. Consequently, even if the slope section 21c is formed on the plate 21 for helping a disc to slide in contact therewith, it may be said that the slope section 21c has been formed on the housing 1.

An inclined surface of the slope section 21c is not limited to a plane, but may be a curved surface. In particular, the inclined surface of the slope section 21c may be linear like the tip end 21d (Refer to FIG. 2) of the plate 21 for helping a disc to slide in contact therewith, or may be an arc-shaped along a peripheral edge of the clamp board 51.

The second supporting unit is preferably composed of the small piece 55a and the flanges 55b, 55. However, as illustrated in FIG. 8D, a lower end of the small piece 55a comes into contact with the top surface of the large diameter portion 51a of the clamp board 51, in a state where the clamp board 51 is constrained. As a result, the second supporting unit prevents the second peripheral edge E2 from moving upward, so that the flanges 55b, 55b may be omitted. However, even in the case that the second supporting unit is composed of only the small piece 55a, the small piece 55a is not intended to be formed at the clamp base 52, but the small piece 55a may be fastened to the clamp base 52 as a member separated from the clamp base 52.

What is claimed is:

1. A disc clamping mechanism comprising:
a clamp board that rotatably clamps a disc in cooperation with a turntable to be rotated in a housing;
a clamp base that rotatably supports the clamp board at a position opposite to the turntable such that the clamp board is movable so as to move away from or come into contact with the turntable; and
a first supporting unit configured to come into contact with a first peripheral edge of the clamp board protruding from the clamp base when the clamp board moves away from the disc according to the movement of the clamp base, to exert pushing force in a direction of the turntable and pushing force in a direction of a movement fulcrum of the clamp base against the first peripheral edge
wherein the clamp base includes a second supporting unit including a small piece and a pair of flanges provided at both sides of the small piece, wherein the small piece is opposite to a second peripheral edge of the clamp board situated at an opposite side to the first peripheral edge and the pair of flanges has surfaces opposite to the turntable, and
when the first peripheral edge is pushed by the first supporting unit, the second peripheral edge gets on the small piece such that both sides of the second peripheral edge come into close contact with the surfaces of the flanges opposite to the turntable, which secures the clamp board.

2. The disc clamping mechanism according to claim 1, wherein the first supporting unit is a slope section formed in the housing.

3. The disc clamping mechanism according to claim 1, wherein the first supporting unit is a slope section securely provided in the housing as a member separated from the housing.

4. A disc drive device comprising:
a housing;
a turntable to be rotated in the housing; and
a disc clamping mechanism that rotatably clamps a disc in the housing;
the disc clamping mechanism comprising:
a clamp board that rotatably clamps the disc in cooperation with the turntable;
a clamp base that rotatably supports the clamp board at a position opposite to the turntable such that the clamp board is movable so as to move away from or come into contact with the turntable; and
a first supporting unit configured to come into contact with a first peripheral edge of the clamp board protruding from the clamp base when the clamp board moves away from the disc according to the movement of the clamp base, to exert pushing force in a direction of the turntable and pushing force in a direction of a movement fulcrum of the clamp base against the first peripheral edge;
wherein the clamp base includes a second supporting unit including a small piece and a pair of flanges provided at both sides of the small piece, wherein the small piece is opposite to a second peripheral edge of the clamp board situated at an opposite side to the first peripheral edge and the pair of flanges has surfaces opposite to the turntable, and
when the first peripheral edge is pushed by the first supporting unit, the second peripheral edge gets on the small piece such that both sides of the second peripheral edge come into close contact with the surfaces of the flanges opposite to the turntable, which secures the clamp board.

5. The disc drive device according to claim 4, wherein the first supporting unit is a slope section formed in the housing.

6. The disc drive device according to claim 4, wherein the first supporting unit is a slope section securely provided in the housing as a member separated from the housing.

* * * * *